Figures 1, 2:
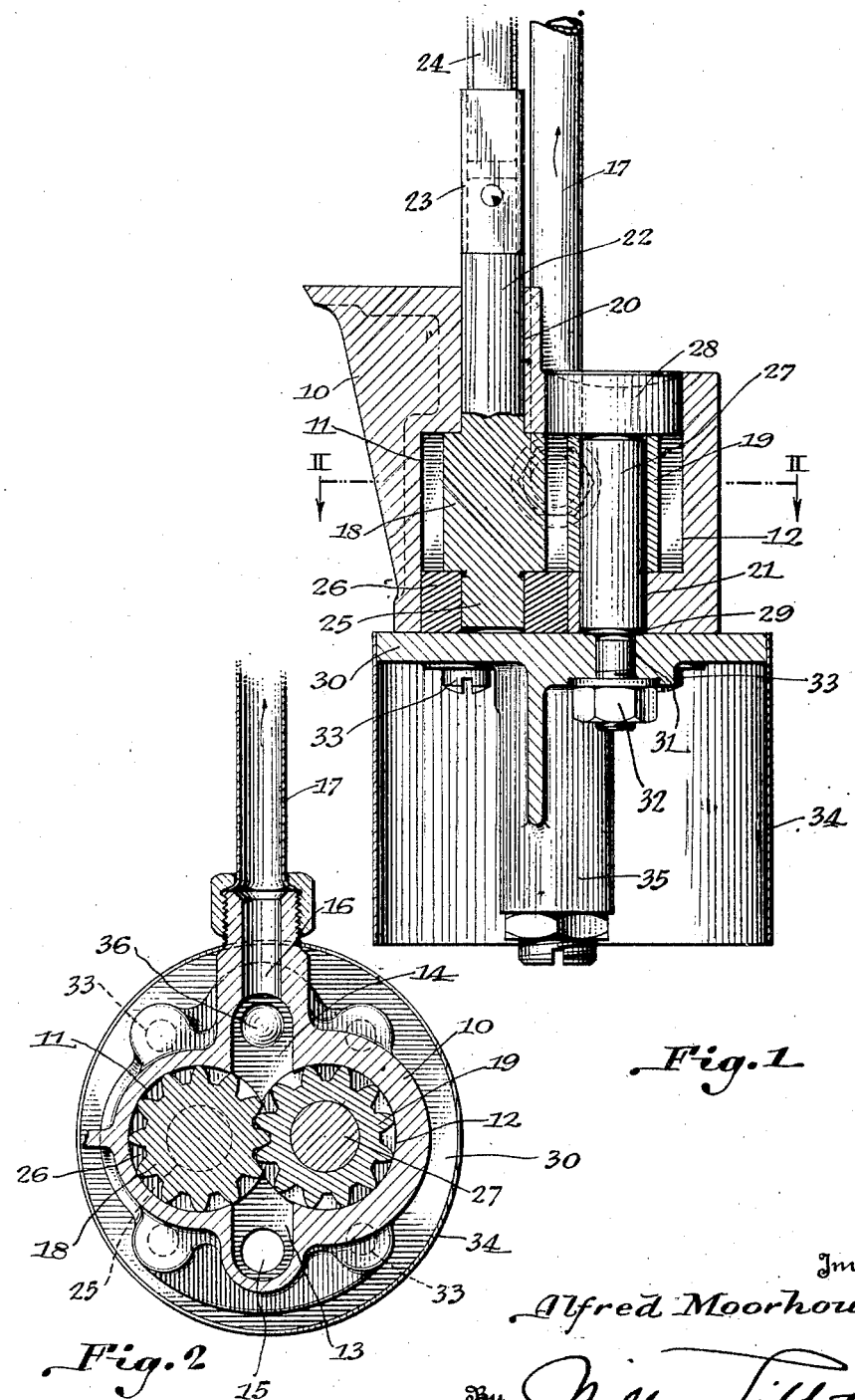

Sept. 4, 1928.

A. MOORHOUSE 1,682,793

INTERNAL COMBUSTION ENGINE

Filed Sept. 21, 1925

Inventor
Alfred Moorhouse

By Millon Tibbetts
Attorney

Patented Sept. 4, 1928.

1,682,793

UNITED STATES PATENT OFFICE.

ALFRED MOORHOUSE, OF DETROIT, MICHIGAN, ASSIGNOR TO PACKARD MOTOR CAR COMPANY, OF DETROIT, MICHIGAN, A CORPORATION OF MICHIGAN.

INTERNAL-COMBUSTION ENGINE.

Application filed September 21, 1925. Serial No. 57,529.

This invention relates to internal combustion engines and particularly to pumps therefor. The pump shown is of the spur gear type and is especially adapted as an oil pump to be mounted in the base or crank case of an engine for pumping oil under pressure to the bearings thereof.

One of the objects of the present invention is to provide a pump that will operate at considerable pressure without appreciable wear.

Another object of the invention is to provide a gear pump that may be manufactured cheaply to close dimensions.

Another object of the invention is to provide a gear pump with bearings at both ends of the gears so that the high pressures produced by the pump will not unduly separate the gears and cause them to wear the casing.

Another object of the invention is to provide a gear pump of simple and inexpensive construction and yet one that will produce high pressures over a long period of time and with little wear.

Other objects of the invention will appear from the following description taken in connection with the drawings, which form a part of this specifiation, and in which:

Fig. 1 is a longitudinal sectional view of a pump made in accordance with this invention, and Fig. 2 is a transverse section on the line II—II of Fig. 1.

Referring to the drawings, 10 represents the pump casing which is formed with two cylindrical chambers or bores 11 and 12. These cylindrical bores overlap in the usual way so that the gears which they are to house may properly mesh between them. The casing, or housing, is also recessed as at 13 to provide an inlet for the pump, and at 14 to provide an outlet therefor. There is an inlet port 15 through which the oil or other liquid may enter, and there is an outlet port 16 and a pipe 17 through which the oil may pass under pressure to the bearings of the engine or elsewhere.

Within the pump casing are spur gears 18 and 19 which intermesh and which fit the bores so that there is only enough clearance at their peripheries to allow freedom of movement without appreciable leakage.

These cylindrical bores or chambers 11 and 12 are open at opposite ends, that is, the bore 11 is open to the outside of the casing at its lower end or may be said to extend at the same diameter to the outer surface of the casing, and the bore 12 extends upwardly its full diameter to the exterior of the casing. The casing is also formed with concentric openings at their other ends, these openings being of lesser diameter. There is an opening 20 extending from the bore 11 upwardly through the casing, and an opening 21 concentric with the bore 12 extending downwardly through the casing.

This arrangement of bores or chambers and openings in the casing requires a very simple machining operation. The two bores and two smaller openings are of exactly the same size and in exact parallelism, that is, within a fraction of a thousandth of an inch, and thus the pump casing may be very accurately and inexpensively made.

The gear 18 is formed with a driving stem or shaft 22 at its upper end, which shaft takes a bearing in the opening 20 of the casing. The upper end of the shaft is pinned to a square sleeve 23, and a driving shaft 24 extends into the sleeve for driving the pump.

The lower end of the gear 18 is formed with an extension or stub shaft 25 which may be approximately the same diameter as the shaft 22. A bearing sleeve 26 fits snugly into the end of the bore 11 and around the shaft 25, and forms a bearing for the lower end of the gear 18. Thus both ends of the gear 18 are supported in the casing and there is no chance for the gear to take an angular position when subjected to heavy oil pressures.

The gear 19 is drilled out and takes a bearing on the shaft of a pin 27, which pin has a large head 28 adapted to fit within and close the upper end of the bore 12. The shaft of the pin 27 extends through the opening 21 and has a shoulder 29 formed where it projects through the casing. Thus the gear 19 is also supported at both ends of the casing and freely rotates on the pin 27 with no chance of taking an angular position when subjected to high oil pressure.

Means for retaining the parts in the positions shown are provided in the form of a plate 30 which extends over the lower face of the casing. The plate has an opening 31 through which the reduced threaded end of the pin 27 extends, and a nut 32 on the end of the pin 27 secures the plate to the casing and secures the pin 27 in position in the bore. Additional securing means for the plate are shown in the form of screws 33 which extend through the plate and into the casing.

The plate 30, in the form shown, supports a guard 34 which extends over a screen which is usually employed in a pump of this kind. The screen is not shown in the drawing. The plate 30 is also shown with a boss or enlargement 35 in which is usually formed an overflow valve which is connected to the pump through a port 36 shown in the outlet passage 14 in Fig. 2.

While I have herein described in some detail a specific embodiment of my invention, which I deem to be new and advantageous and may specifically claim, I do not desire it to be understood that my invention is limited to the exact details of the construction, as it will be apparent that changes may be made therein without departing from the spirit or scope of my invention.

Having thus described my invention, what I claim and desire to secure by Letters Patent is:

1. A gear pump comprising a casing having over-lapping cylindrical bores open at opposite ends, and openings of lesser diameter forming continuations of the bores, intermeshing gears in said bores, one of said gears having a driving stem extending through and bearing in one of said openings, a bearing member for the other end of the gear and means retaining the parts in operable position.

2. A gear pump comprising a casing having over-lapping cylindrical bores, one of said bores being open at one end and the other said bore open at the other end, said casing having a smaller concentric opening at the inner end of each said bore, intermeshing gears in the bores of the casing means in the open ends of said bores and in said openings for supporting said gears at both ends and means for retaining the parts in operable position.

3. A gear pump comprising a casing having over-lapping cylindrical bores, one of said bores extending its full diameter through one end of the casing, intermeshing gears in said casing, one of said gears having an integral driving stem at one end and a bearing stem at the other end, a bearing sleeve in said casing for the bearing stem of said gear and means for retaining the parts in operable position.

4. A gear pump comprising a casing having over-lapping cylindrical bores, said bores extending in full diameter and in opposite directions through the respective ends of the casing, intermeshing gears in said casing, one of said gears having an integral driving stem at one end and a bearing stem at the other end, a sleeve for the bearing stem fitting snugly within the bore and a plate over the end of the casing securing said sleeve and gear in place.

5. A gear pump comprising a casing having over-lapping cylindrical bores, said bores extending in their full diameters in a reverse direction with respect to each other to the outside of the casing, gears in said casing, and a pin forming a trunnion for one of said gears and having a head supported in and closing one of said bores, the other end of said pin being supported in the casing and means for retaining the parts in operable position.

6. A gear pump comprising a casing having over-lapping cylindrical bores open their full diameter at opposite ends, intermeshing gears in said bores, a sleeve in the end of one of said bores for supporting one end of the gear therein, a plate over the sleeve and its bore, a pin in the other bore extending through and forming a trunnion for the other gear, said pin having a head supported in and closing the end of the second mentioned bore and the gear therein, and means securing the pin to the plate.

7. In an oil pump for internal combustion engines, the combination of a housing having communicating chambers therein each formed with an end wall, a pair of intermeshing gears in the chambers between the end walls, a shaft integral with one of the gears, the shaft having a bearing in one of the end walls at one end of the gear and a bearing supported within the chamber at the other end of the gear, a removable arbor supported in the other end wall to rotatably support the other gear and a plate for retaining the parts in position.

8. The combination in an oil pump of the gear type, of a pair of co-operating gears, a housing for the gears having a chamber adapted to co-operate with the gears, a drive shaft for one of the gears, a sleeve bearing for said shaft and a retaining plate for supporting the parts in operable position.

9. The combination in an oil pump of the gear type, of a pair of co-operating gears, a housing for the gears, a removable end wall at one end of the housing and an integral wall at the other end of the housing, an arbor for one of the gears removably secured to the removable wall and supported in a bearing in the integral wall, a drive shaft for the other gear journaled at one side of the integral wall, and a bearing for the other side of said drive shaft mounted in the housing adjacent the removable wall.

10. The combination in an oil pump, of a housing having communicating cylindrical chambers, co-operating gears mounted in the respective chambers, bearings adapted to support each of said gears, one of said bearings for each gear being removably mounted within the chambers of its gear and means retaining the parts in operable position.

In testimony whereof I affix my signature.

ALFRED MOORHOUSE.